United States Patent [19]

Platt, Jr.

[11] 4,282,343

[45] Aug. 4, 1981

[54] POLY-(ALPHA-ALKOXY)ACRYLAMIDE AND POLY-(ALPHA-ALKOXY)ACRYLAMIDE COMPLEXES

[75] Inventor: James L. Platt, Jr., Novato, Calif.

[73] Assignee: Chevron Research Company, San Francisco, Calif.

[21] Appl. No.: 119,254

[22] Filed: Feb. 7, 1980

[51] Int. Cl.$^3$ .................. C08F 8/00; C08F 122/40
[52] U.S. Cl. .................................. 525/336; 525/343; 525/350; 525/384; 525/386; 526/288; 526/304
[58] Field of Search ............... 526/304, 288; 525/336, 525/343, 350, 384, 386

[56] References Cited

U.S. PATENT DOCUMENTS 2,490,756 12/1949 Kenyon et al. .................. 526/304
4,138,541 2/1979 Cenci et al. ..................... 526/304

*Primary Examiner*—Harry Wong, Jr.
*Attorney, Agent, or Firm*—D. A. Newell; T. G. DeJonghe; C. J. Caroli

[57] ABSTRACT

As new products, poly-(alpha-alkoxy)acrylamides containing 1 to 12, preferably 1 to 5 carbon atoms in the alkoxy group. The foregoing polymeric materials are readily complexed with water or low molecular weight hydroxy- or thiol-containing organic compounds. The polymers are useful as oil recovery agents.

8 Claims, No Drawings

POLY-(ALPHA-ALKOXY)ACRYLAMIDE AND POLY-(ALPHA-ALKOXY)ACRYLAMIDE COMPLEXES

BACKGROUND OF THE INVENTION

This invention relates to new polymeric materials, that is, poly-(alpha-alkoxy)acrylamides which have utility in enhanced oil recovery. In particular, the alkoxy group contains 1 to 12 preferably 1 to 5 carbon atoms. Also contemplated within the purview of the invention are these polymers complexed with low molecular weight hydroxy- or thiol-containing compounds or water.

Polyacrylamide is a known commercial polymer. Among other things, it is sold for use in enhanced oil recovery. For this use, an aqueous solution of the polymer is injected into an underground oil bearing formation to assist in displacing the oil to be recovered. For this purpose it is necessary that the polymer be water soluble and thereby to give a highly viscous solution. Furthermore, since the underground formations are hot and frequently contaminated with aqueous brine, it is necessary that the polymer be both thermally stable and brine stable. On both of these counts, polyacrylamide is weak.

SUMMARY OF THE INVENTION

The present invention is based on the discovery that a polymer of alpha-alkoxyacrylamide, that is, poly-(alpha-alkoxy)acrylamide, having 1 to 12, preferably 1 to 5 carbon atoms in the alkoxy group, have the water solubility and water thickening properties of polyacrylamide. The polymer of the invention is not only thermally stable but is also surprisingly brine-stable. The invention also includes the foregoing polymer complexed with water or a low molecular weight hydroxy- or thiol-containing organic compound. The complexed polymer possesses similar properties.

DETAILED DESCRIPTION OF THE INVENTION

The new polymer of the invention is poly-(alpha-alkoxy)acrylamide in which the alkoxy group has from 1 to 12 carbon atoms, preferably 1 to 5 carbon atoms, has the following structure:

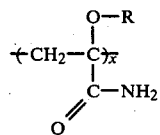

wherein R is an alkyl group of 1 to 12 carbon atoms, and x ranges from about 100 to 100,000. Preferably the polymer is poly-(alpha-methoxy)acrylamide.

Another aspect of this invention is based on the surprising discovery that the polymer of this invention readily complexes with one mol of water or one mol of a low molecular weight hydroxy- or thiol-containing organic compound per mol of monomer, or recurring units, in the polymer. In this form the complexed polymer has the formula:

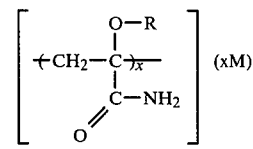

in which R and x have the same meaning as before and M is water or a low molecular weight hydroxy-containing or thiol-containing compound. Compounds represented by M have fewer than 4 carbon atoms, preferably one carbon atom. Hydroxy-containing compounds include alcohols, such as methanol, ethanol, etc., and acids such as formic acid, acetic acid, glycolic acid, glycine, etc. The thiol-containing compounds include methylmercaptan, ethylmercaptan, mercaptoacetic acid, thiolacetic acid, etc. The preferred compound used for complexing the poly(alpha-alkoxy)acrylamide is water.

Polymers containing a complexed molecule are obtained by dissolving the non-complexed polymer in the hydroxy-containing or thiol-containing compound. Precipitation by addition of a non-solvent, or by concentration gives the desired complex polymer.

The polymers of this invention have utility as enhanced oil recovery agents (pushers). For this purpose they are dissolved in water to form a solution containing from 0.01 to 10 weight percent of polymer. These solutions have viscosities in the range of 2 to 500 centipoises, which are useful for oil recovery. Surprisingly, heating and adding salt to form a hot brine does not significantly effect the solution viscosity even after several hours. Thus, these polymers are surprisingly stable oil recovery agents.

In addition to the above-described utility, these polymers also form fibers and films. Such objects are water soluble and may be used in non-aqueous applications or in applications where a limited product life is desirable; for example, pre-packaged or encapsulated pesticides. The polymers also have utility as flocculents, leaching agents and papermaking aids.

The polymers of this invention are made by polymerizing an alpha-alkoxyacrylamide in which the alkoxy group has from 1 to 12 carbon atoms. The first member of this series, alpha-methoxyacrylamide was first reported in 1942 by J. W. Baker (J. Chem. Soc. 1942, 520) and later by N. Ogata et al (Bull. Chem. Soc. Japan 43, 2987, 1970) as a derivative of methyl alpha-methoxyacrylate upon reaction with ammonia. The other members of the series are unknown. These include alphaethoxyacrylamide, alpha-propoxyacrylamide, alpha-amyloxyacrylamide, alpha-nonoxyacrylamide, alpha-dodecanoxyacrylamide, etc. Mixtures of monomers may be used to form copolymers. Preferably the alkoxy group in the monomer has from 1 to 5 carbon atoms. The preferred starting material is alpha-methoxyacrylamide.

Monomers are prepared by the method described in the cited reference, or preferably they may be made by:

(1) Reacting an alkyl pyruvate with a trialkyl orthoester to form the corresponding alpha,alpha-dialkoxypropionate ester.

(2) Treating the alpha,alpha-dialkoxypropionate with an acid chloride, organic base such as pyridine or quinoline and a catalytic amount of inorganic base to form an alpha-alkoxy acrylate.

(3) The alpha-alkoxyacrylate is mixed with an equivalent of aqueous ammonium hydroxide to form the alpha-alkoxyacrylamide.

The polymer itself is prepared by contacting a monomer with a small amount of an addition polymerization intiator. The initiator may be one of three types, (1) free radical, (2) cationic, and (3) redox-pair. Preferably polymerization is initiated by a free-radical source.

The free-radical initiated polymerization is preferably carried out without a solvent, but inert, organic liquids may be used if desired. Such solvents include tetrahydrofuran, dimethoxy ethane, etc. Persulfate initiated polymerizations are carried out in water.

Polymerization is initiated by admixing the initiator with the monomer in an appropriate vessel at a temperature in the range of 0° to 50° C., preferably 20° C. Then the mixture is maintained at a temperature of 20° to 200° C. for about 1 to 100 hours. The product is a hard, water soluble glass-like solid.

The polymerization is usually carried out at normal atmospheric pressure, but sub- or superatmospheric pressure may also be used. Preferably polymerizations are carried out at autogenous pressures. The polymerization system is usually maintained under an inert atmosphere, such as nitrogen, carbon dioxide or helium; but air may also be used.

Typical free-radical type initiators include, potassium persulfate, t-butyl hydroperoxide, cumyl hydroperoxide, hydrogen peroxide, di-t-butyl peroxide, methyl ethyl ketone peroxide, 2,2'-azobis(2-methylpropionitrile), and the like. Preferably, the initiator is cumyl peroxide.

In the cationic-initiated polymerizations, Lewis acids or mineral acids may be used as initiator. Typical Lewis acids include aluminum trichloride, boron trichloride, boron trifluoride, etc. The useful mineral acids include sulfuric acid. Boron trifluoride etherate is the preferred cationic initiator.

Redox-pair initiated polymerization is also a useful method for preparing the polymers of this invention. A typical redox-pair is an aqueous solution of sodium bromate and sodium sulfite.

In the cationic, aqueous persulfate, or aqueous redox-pair initiated polymerizations, the monomer and initiator system are combined at ambient temperature in an appropriate reactor. The reaction is carried out in an inert atmosphere, e.g., nitrogen, under autogenous pressure in a sealed reactor. The polymerization reaction is maintained at 100° to 115° C. for 6 to 20 hours.

The polymeric product is obtained as an aqueous solution from the persulfate or redox-pair polymerizations. The product of the cationic initiated polymerization is obtained as a hard glass-like solid.

In all cases of polymerization, the product work-up gives either an anhydrous, non-complexed polymer, or it gives a polymer containing one mol of a compound in complex combination, hereinafter referred to as a "complexed polymer".

The anhydrous, non-complexed polymer is obtained readily from the hard, glass-like polymerization product by subliming the unreacted monomer out of the crushed polymeric solid. Sublimation is carried out at a temperature in the range of 110°–190° C. under reduced pressure. The non-complexed polymer may be obtained from the complexed polymer by heating the latter at a temperature in the range of 150°–200° C., wherein the complex breaks down to release the low molecular weight compound. Temperatures in excess of this range are not useful because the polymer itself begins to decompose at the higher temperatures.

The complexed polymer is prepared by forming a solution of the polymer in the hydroxy-containing or thiol-containing compound. Precipitation by adding a non-solvent, or by concentration, gives the polymer with a molar amount (based on monomer) of the solvent compound in complex combination with the polymer. The polymer preferentially complexes with the more acidic compound from a mixture of compounds.

The preferred method of work-up comprises dissolving the solid glass-like polymer in from 4 to 6 times its weight of water. To the resulting solution, there is added from 2 to 4 times its volume of an alcohol, such as methanol, t-butanol, etc. or acetone. The polymer immediately precipitates leaving any unreacted monomer and initiator in solution. An alternate method is to add the aqueous solution of polymer dropwise to the alcohol or acetone. In either case, the precipitated polymer is collected by filtration and dried in a vacuum desiccator. This procedure gives a polymer containing one mol of water per mol of monomer in complex combination. It is a solid, water soluble material.

In the preferred mode for preparing the compositions of this invention, alpha-methoxyacrylamide monomer is mixed with cumyl peroxide at 18°-20° C. in a reaction vessel under an inert atmosphere of nitrogen at atmospheric pressure. The thusly formed solid mixture is heated to form a melt at about 100° to 115° C. This melt becomes a solid mass after about 3 to 12 hours at this temperature. The polymer is purified by dissolving in water, adding methanol to precipiate the polymer which is isolated by filtration. This polymer is then dried in a vacuum desiccator to give the product containing one mol of water per mol of monomer. This composition is highly satisfactory for preparing aqueous enhanced oil recovery solutions.

The polymeric product of the invention has a weight average molecular weight in the range of 10,000 to 10,000,000 preferably 20,000 to 200,000. These polymers may be used as obtained for aqueous enhanced oil recovery solutions or they may be partially hydrolyzed by heating with water in the presence of an acid or base catalyst. By this operation, some of the amide groups are converted to carboxylic acid groups or to salts thereof. Preferably the amount of hydrolysis is in the range of 10 to 50% of the amide groups. Preferably, unhydrolyzed polymer is employed in oil recovery since it has maximum thermal and brine stability.

The following examples, preceded by a description of the analytical procedures used in connection therewith, illustrate the preparation of monomer, the polymerization, and the uses of these polymers. The examples are purely illustrative and suggest alternative embodiments. Accordingly, the examples are not intended to limit the scope of the claims. Unless specifically noted, all quantities are in parts by weight.

ANALYTICAL PROCEDURES

General

NMR spectra were recorded in $D_2O$ using a Varian T-60 spectrometer and are reported downfield from 3-(trimethylsilyl)-1-propane-sulfonic acid, sodium salt (DSS). Infrared spectra were recorded on a Perkin Elmer 337 spectrophotometer. Thermogravimetric analysis were recorded on a Perkin Elmer TGS-2 Thermogravimetric System. Melting points were obtained using a Mel-Temp capillary tube apparatus and are corrected. Viscosity measurements were made using Brookfield Synchro Lectric LVT viscometer equipped with U.L. adaptor.

NMR spectroscopy ($D_2O$ solvent) was used to monitor conversion of monomer to polymer. Spectra signals were measured downfield from 3-(trimethylsilyl)-1-propane sulfonic acid, sodium salt, (DSS). The area of monomer alkoxy signal at 3.70δ was compared with the polymer alkoxy signal at 3.27δ, then:

Percent Conversion: = $\dfrac{\text{Area 3.27δ signal}}{\text{Areas (3.70δ signal + 3.27δ Signal)}} \times 100$ Polymer weight average molecular weights were estimated by applying the Mark-Houwink-Sakurada equation and the constants used for polyacrylamide (1 N Sodium nitrate, 0.5% polymer concentration, 30° C.):

| | |
|---|---|
| $[\eta] = K M^a$ | $K = 3.37 \times 10^{-4}$ dl/g. |
| | a = 0.66 |
| | M = molecular weight |
| | $[\eta]$ = intrinsic viscosity |

EXAMPLE 1

This experiment demonstrates preparation of high polymer at ambient pressure using 2% initiator.

Alpha-methoxyacrylamide (10.0 g) and cumyl peroxide (0.2 g) were placed in a 100 milliliter test tube and heated in a 100° C. oil bath. At the end of 20 hours the resulting amber glass was dissolved in 30 ml. water. This solution was added dropwise to 300 ml. acetone. The precipitated polymer was dried in a desiccator to give 6.4 g solid. Analysis calculated for $C_4H_7NO_2.H_2O$: C, 40.30; H, 7.56 and N, 11.75%. Found: C, 41.07; H, 7.48; N, 10.98%. Weight average molecular weight 80,000. NMR: 3.27δ (m,3H,—$OCH_3$) and 2.30δ (m, 2H,—$CH_2$), m.p. >260° C.

EXAMPLE 2

This experiment demonstrates the preparation of high polymer at ambient pressure and preparation of an amorphous film containing one molecule of water per repeating unit of polymer.

Alpha-methoxyacrylamide (5.0 g) was placed in a test tube equipped with a Pyrex cold finger. Cumyl peroxide (0.05 g) was added. The solids were mixed, the test tube placed in a 110° C. oil bath. The resulting melt was heated under nitrogen atmosphere for 17 hours to give a clear glass. The glass was dissolved in 30 ml. water and 90 ml. t-butanol added to precipitate the polymer. The wet polymer was spread on a watch glass and allowed to air-dry to a clear film, m.p. 309° C. (dec). Analysis calculated for $C_4H_7No_2.H_2O$: C, 40.30; H, 7.56; N, 11.75% Found 3, 39.57; H, 6.92; N, 11.36%. Thermogravimetric analysis showed 15% weight loss ($H_2O$) at 101° C. consistent with the proposed structure of one water per repeating unit. X-ray diffraction showed the polymer to be non-crystalline. Weight average molecular weight was 75,000. Spectral anlysis showed: IR 1690 $cm^{-1}$ (—$CONH_2$), 2600 $cm^{-1}$ (HOH). NMR: 3.23δ (m, 3H,—$OCH_3$) and 2.30δ (m, 2H—$CH_2$—).

EXAMPLE 3

This experiment demonstrates the preparation of high polymer at super atmospheric pressure using 0.5 and 5% initiator.

Alpha-methoxyacrylamide (1.0 g) was placed in two Pyrex tubes 12×75 mm. each. Cumyl peroxide was added sufficient to give mixtures containing 0.5, and 5.0% by weight. The tubes were purged three times with nitrogen, sealed and suspended in a 101° C. oil bath for 20 hours. Monomer conversions were 83, and 87% respectively. The contents of each tube were dissolved in 20 ml. water and 40 ml. t-butanol was added to precipitate the polymer. The solid was collected and redissolved in water and acetone was added to reprecipitate the polymer. The solids were stored in a vacuum desiccator (140 mm. Hg) at ambient temperature. Spectral analysis: NMR; 3.23δ (m, 3H,—$OCH_3$) and 2.30δ (m, 2H,—$CH_2$—). Weight average molecular weights were 77,000 respectively and 137,000.

EXAMPLE 4

This experiment demonstrates the preparation of high polymer at superatmospheric (autogenous) pressure using 1% initiator.

Alpha-methoxyacrylamide (1.0 g) and cumyl peroxide (0.01 g) were placed in heavy walled 12×75 mm Pyrex tube. The contents were purged three times with nitrogen, sealed and placed in an oil bath at 100° C. After 20 hours the tube contents (clear yellow glass) were dissolved in water (30 ml.). Monomer conversion was 82%. The polymer was precipitated by adding acetone (20 ml.). The solid was collected and dried in vacuum desiccator (140 mm Hg) at ambient temperature. Analysis calculated for $C_4H_7NO_2.H_2O$: C, 40.30; H, 7.56; N, 11.75%. Found: C, 40.88; H, 7.57; N, 11.09%. Weight average molecular weight: 99,800. m.p. 309° C. (dec). Spectral analysis showed: 3.23δ (m, 3H,—$OCH_3$) and 2.30δ (m, 2H,—$CH_2$—). IR: 1690 $cm^{-1}$ (—$CONH_2$).

EXAMPLE 5

This experiment demonstrates the preparation of high polymer using ambient pressure and 1% initiator.

Alpha-methoxyacrylamide (5.0 g) was charged to a 100-milliliter test tube and cumyl peroxide (0.05 g) added. Under a nitrogen atmosphere the mixture was heated in a 100° C. oil bath. After 65 hours the resultant clear glass was dissolved in 30 ml. water. the work-up in the manner of Example 3 using methanol to precipitate the polymer gave a white solid, m.p. >260° C. The weight average molecular weight was 63,000. Analysis calculated for $C_4H_7NO_2.H_2O$: C, 40.30; H, 7.56 and N, 11.75%. Found: C, 39.28; H, 6.68 and N, 11.13%.

EXAMPLE 6

This experiment demonstrates the formation of polyalpha-methoxyacrylamide containing one water per repeating unit of polymer.

Four Pyrex tubes (12×75 mm) were each charged with alpha-methoxyacrylamide (1.0 g) and cumyl peroxide (0.01 g). The tubes were purged three times with nitrogen, sealed and placed in a 100° C. oil bath. After 17 hours the contents of tubes were dissolved in 20 ml. water and acetone added to precipitate the polymer. Drying in a vacuum desiccator to constant weight gave white solids, m.p. >250°. Analysis calculated for $C_4H_7NO_2.H_2O$: C, 40.30; H, 7.56; N, 11.75%. Found: C, 38.35; H, 6.74; N, 11.34%. Spectral analysis showed NMR, 3.2δ (m,3H,—OCH$_3$), 2.30δ (m,2H,—CH$_2$—) and 4.61δ (s,HDO).

EXAMPLE 7

This experiment demonstrates the formation of high polymer using as initiator 2,2'-azobis(2-methylpropionitrile), commonly known as AIBN.

In the manner of Example 6, alpha-methoxyacrylamide and 2% by weight AIBN were heated in sealed tubes for 19 hours in a 115° C. oil bath. The conversion to poly-alpha-methoxyacrylamide was 4%.

EXAMPLE 8

This experiment demonstrates forming a formic acid analog of hydrated poly-(alpha-methoxy)acrylamide.

Poly-alpha-methoxyacrylamide hydrate which had been heated under vacuum at 175° C. to constant weight was slurried in 50 ml. methanol. Addition of 20 ml. of 88% formic acid gave a viscous film. It was collected, slurried in ethyl ether and dried in a vacuum desiccator to give a tan solid having a melting point greater than 260° C. Analysis calculated for $C_4H_7NO_2 \cdot HCO_2H$: C, 40.08; H, 6.1 and N, 9.5%. Found: C, 39.9; H, 7.76, and N, 10.18%.

EXAMPLE 9

This experiment demonstrates a Lewis acid initiated polymerization.

Four Pyrex tubes (12×75 mm.) were charged with alpha-methoxyacrylamide (1.0 g) and boron trifluoride etherate initiator (0.05 g) under a nitrogen atmosphere. The tubes were chilled in dry ice, sealed and suspended in a 95-97% C oil bath. At the end of 20 hours work-up in usual manner gave a polymer. Spectral analysis showed NMR, 3.2δ (m, 3,H—OCH$_3$) and 1.62δ (m, 2H,—CH$_2$—).

EXAMPLE 10

This experiment demonstrates the preparation of high polymer using a redox-pair to initiate polymerization.

Alpha-methoxyacrylamide (23.8 g) was dissolved in water (200 ml.) which had been boiled and sparged with a nitrogen. Redox-pair sodium bromate (0.024 g) and sodium sulfite (0.006 g) were added at 40°. Sulfuric acid was added to adjust the solution to pH 3–6. The solution was heated at 90° C. for 20 hours. Conversion of monomer to polymer was 6.5%.

EXAMPLE 11

This experiment demonstrates an aqueous solution polymerization using potassium persulfate initiator.

Alpha-methoxyacrylamide (6.2 g), potassium persulfate (0.03 g) and 2-propanol (0.94 g) were dissolved in 50 g of water which had been boiled and sparged with nitrogen. After 3 hours at 75° C., conversion to poly-alpha-methoxyacrylamide was 8%.

EXAMPLE 12

This experiment demonstrates the preparation of anhydrous noncomplexed poly-(alpha-methoxy)acrylamide.

Alpha-methoxyacrylamide (20.0 g) and cumyl peroxide (0.4 g) were placed in a 100-milliliter test tube and heated in a 100° C. oil bath under a nitrogen atmosphere. After 20 hours the resulting glass was crushed in a mortar and pestle to a screen size of 28 mesh (Tyler). A portion of the polymer was heated 6 hours at 115° C. in a vacuum sublimer to remove unreacted monomer. A quantitative thermal gravimetric analysis showed <1% weight loss to 175° C., demonstrating no water to be present. Spectral analysis of anhydrous polymer showed: NMR, 3.27δ (m, 3H, —OCH$_3$) and 2.32δ (m, 2H, —CH$_2$).

LABORATORY EVALUATION

Tests were carried out to determine the stability of the polymers of this invention. In this test, samples of polyacrylamide and poly-(alpha-methoxy)acrylamide were dissolved in water at 21° C. to form an aqueous solution. Viscosities were determined on these solutions, and then sufficient salt was added to give 3% aqueous sodium chloride as the solvent. The viscosities were measured again. Table I gives the composition of the samples and the results of this test.

TABLE I

BROOKFIELD* VISCOSITIES IN WATER AND 3% AQUEOUS SODIUM CHLORIDE AT 21° C.

| Polymer (Mole Weight) | Concentration (%, Wt/Wt) | Viscosity, cps H$_2$O | 3% NaCl |
|---|---|---|---|
| Acrylamide, Partially Hydrolyzed (200,000) | 1.0 | 4.7 | 2.9 |
| Acrylamide, Cyanamer P-250 (5,000,000) | 0.1 | 2.1 | 1.6 |
| Acrylamide, Cyanamer P-250 | 1.0 | 95.3 | 65.0 |
| Acrylamide, Aldrich | 1.0 | 62.3 | 57.6 |
| Alpha-MAA** (80,000) | 10.0 | 34.0 | 43.2 |
| Alpha-MAA** (136,000) | 1.0 | 1.7 | 1.8 |
| Alpha-MAA** (77,000) | 1.0 | 1.6 | 1.6 |

*Brookfield LVT Synchro Lectric Viscometer equipped with U.L. adaptor.
**Poly-(alpha-methoxy)acrylamide All of the prior art polyacrylamides underwent a decrease in viscosity upon addition of salt, showing poor brine stability. The polymers of the present invention did not undergo any decrease in viscosity, showing very good brine stability.

Another test was carried out in which the viscosities of aqueous 3% sodium chloride solutions of polyacrylamide and poly-(alpha-methoxy)acrylamide were determined before and after heating for 60 minutes at 90° C. Table II gives the compositions tested and the results.

TABLE II

BROOKFIELD VISCOSITIES OF 3% SODIUM CHLORIDE SOLUTIONS AFTER HEATING TO 90° C. FOR 60 MINUTES

| Polymer (Mole Weight) | Concentration (%, Wt/Wt) | Viscosity Before Heating | After Heating |
|---|---|---|---|
| Polyacrylamide (5,000,000) | 1 | 77.0 | 66.6 |
| Polyacrylamide (5,000,000) | 1** | 66.5 | 55.0 |
| Alpha-MAA* (77,000) | 1 | 1.7 | 1.8 |
| Alpha-MAA* (136,000) | 1 | 1.9 | 1.9 |

*Poly-(alpha-methoxy)acrylamide
**Distilled water only

The solutions of the prior art compounds both suffered about a 15% decrease in viscosity upon heating. The solutions of the compounds of this invention did not decrease in viscosity upon hot brine treatment. This shows these latter compounds to be exceptionally stable to brine solutions.

What is claimed is:

1. Poly-(alpha-alkoxy)acrylamide having the formula:

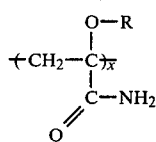

wherein R is an alkyl group of 1 to 12 carbon atoms and x is an integer ranging from about 100 to 100,000.

2. Poly-(alpha-alkoxy)acrylamide according to claim 1 having a molecular weight of about 10,000 to 10,000,000 determined by applying the Mark-Houwink-Sakurada equation.

3. Poly-(alpha-alkoxy)acrylamide according to claim 1 wherein the alkoxy group has 1 to 5 carbon atoms.

4. Poly-(alpha-alkoxy)acrylamide according to claim 1, wherein the alkoxy group is methoxy.

5. Poly-(alpha-alkoxy)acrylamide according to claim 2 having a molecular weight in about the range 20,000 to 200,000 determined by applying the Mark-Houwink-Sakurada equation.

6. Complexed poly(alpha-alkoxy)acrylamide having the formula

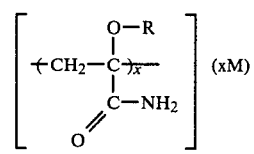

wherein R is an alkyl group of 1 to 12 carbon atoms and x is an integer ranging from about 100 to 100,000, and M is water or a low molecular weight hydroxy-containing or thiol-containing compound.

7. Complexed poly(alpha-alkoxy)acrylamide according to claim 6 in which M is a low molecular weight compound containing less than 4 carbon atoms.

8. Complexed poly(alpha-alkoxy)acrylamide according to claim 6, wherein M is water or formic acid.

* * * * *